United States Patent [19]
Krishnan

[11] Patent Number: 5,155,851
[45] Date of Patent: Oct. 13, 1992

[54] ROUTING AN INCOMING DATA STREAM TO PARALLEL PROCESSING STATIONS

[75] Inventor: Komandur R. Krishnan, Bridgewater, N.J.

[73] Assignee: Bell Communications Research, Inc., Livingston, N.J.

[21] Appl. No.: 762,610

[22] Filed: Sep. 19, 1991

Related U.S. Application Data

[63] Continuation of Ser. No. 351,377, May 15, 1989, abandoned.

[51] Int. Cl.⁵ .............................................. G06F 15/16
[52] U.S. Cl. ............................ 395/650; 364/DIG. 1; 364/228.3; 364/230.3; 364/244.3; 364/281
[58] Field of Search ...................................... 395/650

[56] References Cited

U.S. PATENT DOCUMENTS

| | | | |
|---|---|---|---|
| 4,126,895 | 11/1978 | Weemaes et al. | 395/650 |
| 4,394,727 | 7/1983 | Hoffman et al. | 395/650 |
| 4,403,286 | 9/1983 | Fry et al. | 395/650 |
| 4,495,570 | 1/1985 | Kitajima et al. | 395/650 |
| 4,577,272 | 3/1986 | Ballew et al. | 395/650 |
| 4,590,555 | 5/1986 | Bourrez | 395/650 |
| 4,642,756 | 2/1987 | Sherrod | 395/650 |
| 4,748,558 | 5/1988 | Hirosawa et al. | 395/650 |
| 4,839,798 | 6/1989 | Eguchi et al. | 395/650 |
| 4,852,001 | 7/1989 | Tsushima et al. | 395/650 |
| 4,954,945 | 9/1990 | Inoue | 395/650 |
| 4,985,831 | 1/1991 | DuLong et al. | 395/650 |
| 5,053,950 | 10/1991 | Naganuma et al. | 395/650 |

OTHER PUBLICATIONS

Yao, D. et al., "The Optimal Input Rates to a System of Manufacturing Cells," *INFOR*, vol. 25, No. 1, pp. 57–65 (1987).

*Primary Examiner*—David L. Clark
*Assistant Examiner*—Matthew C. Fagan
*Attorney, Agent, or Firm*—Leonard Charles Suchyta; John T. Peoples

[57] ABSTRACT

A process controls the routing of an arriving job in a job stream through a switch to one of a plurality of processing stations. At predetermined time intervals, occupancy factors associated with the stations are computed as determined by station configuration information and job stream information. Upon the arrival of an incoming job, the occupancy factors corresponding to the current processing status of the stations are used to compute station utilization values. The station having the minimum utilization value is selected to receive and process the incoming job provided this minimum value is less than a preselected threshold; otherwise, the incoming job is denied processing permission.

7 Claims, 2 Drawing Sheets

ROUTING AN INCOMING DATA STREAM TO PARALLEL PROCESSING STATIONS

This is a continuation of application Ser. No. 07/351,377, filed May 15, 1989 now abandoned.

FIELD OF THE INVENTION

This invention relates generally to routing an arriving job stream to parallel, autonomous stations and, more particularly, to the allocation of the stream of incoming jobs among several parallel stations, each with its own service rate and finite buffer.

BACKGROUND OF THE INVENTION

The problem of routing an input job stream to one of several parallel processing stations, each with a finite buffer, so as to minimize the probability of blocking has conventionally been treated using state-independent or state-dependent approaches. Blocking in the sense used here means that an arriving job from the stream cannot be routed to any station because the buffers in all stations are full.

Representative of the state-independent approach is the description contained in the article entitled "The Optimal Input Rates to a System of Manufacturing Cells", by D. D. Yao and J. G. Shanthikumar, and published in INFOR Vol. 25, No. 1, pg. 57-65, 1987. Yao et al have supplied a routing technique by deriving an optimum Bernoulli split of the arrival stream, making use of convexity properties of a so-called loss-rate function defined by Yao et al. However, such a routing method does not take into account the various states of the stations, and therefore the optimization is restricted to the framework of state-independent decision rules and routing methods.

An optimum state-dependent assignment or routing rule may be derived with the assumption of Poisson arrivals for the jobs and exponential service-time distributions for the stations and by solving the associated finite-state Markov decision process. The technique is state-dependent since information about the state of each processing station, such as the total number of jobs assigned to each buffer, is available and may be used for computation by a front-end routing processor. However, the state-space grows very rapidly with buffer capacities and this limits the size of systems that may be solved, particularly in real-time.

SUMMARY OF THE INVENTION

These shortcomings as well as other limitations of conventional techniques are obviated, in accordance with the present invention, by a method that routes an incoming job to an appropriate one of the numerous processing stations using policy-iteration on a nominal state-independent technique. The method allows for a nearly-optimal, state-dependent allocation method without the burdensome computation required of the optimal, state-dependent scheme.

Broadly speaking, the method applies to a system for routing an offered job from an incoming job stream through a switching device to one of several processing stations. At predetermined time intervals, occupancy factors are computed for the stations as determined by the system configuration and the rate of arrival of incoming jobs from the stream. Upon the arrival of an offered job from the stream, the occupancy factors corresponding to the activity status of the stations at the instant of the arrival of the offered job are used to compute utilization values associated with each of the stations. The minimum utilization value is compared to a preselected threshold. If the minimum utilization factor is less than the threshold, then the station having this minimum value is the one selected for processing the job, and the offered job is routed through the switch accordingly. Otherwise the offered job is blocked.

The organization and operation of this invention will be better understood from a consideration of the detailed description of the illustrative method, which follows, when taken in conjunction with the accompanying drawing.

DETAILED DESCRIPTION

Figure 1:
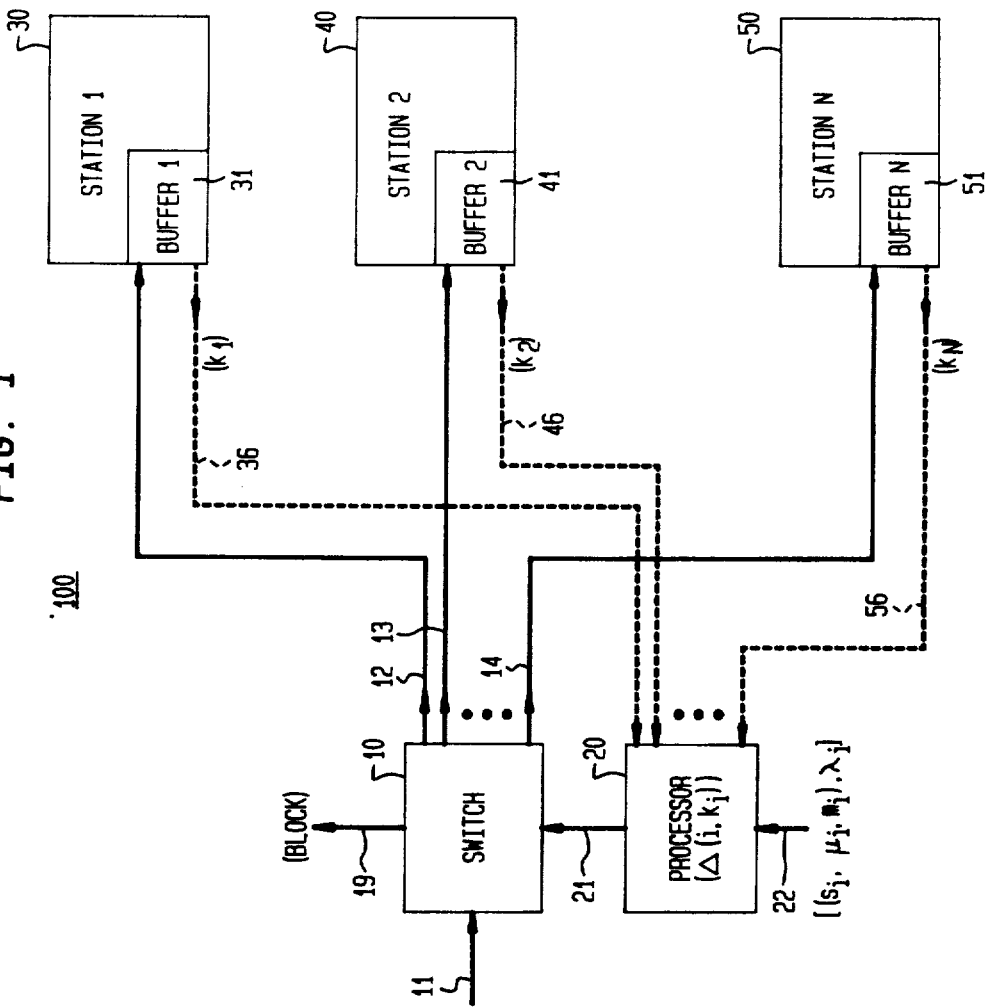
FIG. 1 is a block diagram depicting a parallel station system illustrative of the types of systems controlled by the methodology of the present invention.

With reference to FIG. 1, a block diagram of parallel station system 100 is shown as comprising switch 10, processor 20 and numerous (N) stations of which stations 30, 40 and 50 are representative. A job stream, appearing on line 11, serves as an input to switch 10. Each offered job in the stream is to be assigned, in the absence of blocking, to one of the stations 30,40, ... ,50 operating in parallel. If an offered job is assigned to station 30, it is transmitted from switch 10 to station 30 via line 12. Similarly, lines 13 and 14 convey jobs assigned to stations 40 and 50, respectively.

Figure 2:
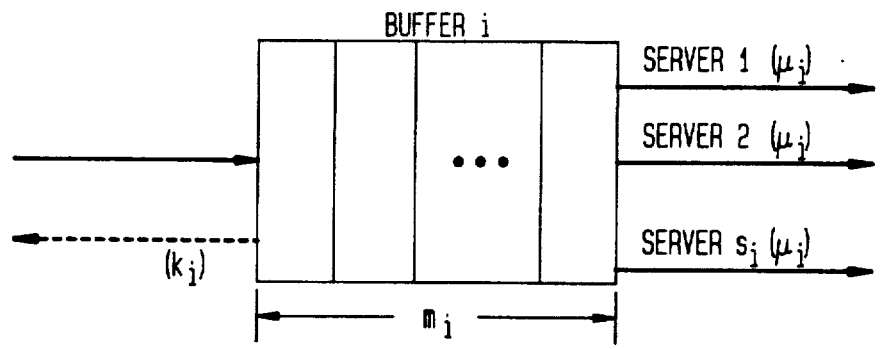
FIG. 2 is a block diagram illustrative of the buffer of FIG. 1 showing various parameters defined for the buffer.

Each job arriving at an individual station is stored in a buffer. For instance, buffer 31 is shown as composing part of station 30. In the modeling process discussed below, each buffer is treated as a queue, so system 100 may be viewed as being composed of N queues operating in parallel. The composition of a queue is shown in FIG. 2 for the $i^{th}$ buffer. This queue has servers $1,2, \ldots ,s_i$, each of service rate $\mu_i$. These are also $m_i$ additional waiting positions available. The parameter $k_i$ denotes the total number of jobs in the queue; thus, $k_i$ ranges over $0,1,2, \ldots ,m_i+s_i$.

As is depicted in FIG. 1, each buffer 31,41,51 is monitored by processor 20 to determine the total number of jobs in each buffer, that is, the parameter $k_i$ of each queue. For instance, lead 36 emanating from buffer 31 supplies the value of $k_1$ to processor 20. The collection of values for the various buffers, namely, $(k_1, k_2, \ldots ,k_N)$ representing the current job state, serves as one input to processor 20. Station configuration information ($s_i$, $\mu_i$ and $m_i$), as well as the information to compute the offered load factor $\lambda_i$ (discussed below), serve as a second input to processor 20 via lead 22.

Processor 20 computes occupancy factors designated by $\Delta(i,k_i)$ in FIG. 1. Based on these factors, the switching state of switch 10 is selected by the control signal on lead 21 emanating from processor 20. The control signal includes: information, designated a station parameter, that identifies which of the stations is to receive the offered job, thereby effectuating the desired switching action; or a blocking signal to indicate to switch 10 that no station is available to accept the offered job. The mathematical formulation below details the manner in which the occupancy factors are computed. These factors have the general interpretation: each $\Delta(i,k_i)$ approximates the "cost", in terms of future job blockings, of increasing the number of jobs in queue i from $k_i$ to $k_i+1$. The formulation provides a methodology, and concomitant control mechanism, for routing job arrivals to one of the N stations such that the probability of blocking an offered job from the job stream is minimized. An indication that a job has been blocked is provided by line 19 emanating from switch 10.

FORMULATION

The development begins by considering a single queue of s servers, each of service rate $\mu$, with m additional waiting positions and an incoming Poisson stream of rate $\lambda$; these parameters define an M/M/s/(s+m) queue. Furthermore, it is supposed that k (0,1,2, ... ,m+s) denotes the total number of jobs in the buffer queue, including in-service jobs and waiting jobs. With $V_k$ defined as the cost of state k, an occupancy factor, designated $\Delta_k$, is defined as follows:

$$\Delta_k \triangleq V_{k+1} - V_k = N_k G \quad (1)$$

where $N_k$ = expected number of arrivals during the first passage from state k to state (k+1), and G = the steady-state blocking of the M/M/s/(s+m) queue, $$\text{or } G = \frac{\rho^m(1-\rho)B(s,a)}{1 - \rho + B(s,a)\rho(1 - \rho^m)} \quad (2)$$

with $a = \frac{\lambda}{\mu}$, $\rho = \frac{a}{s}$ and

B(s,a) = the Erlang-B blocking of an s-server queue.

A first-order difference equation may then be used to compute $N_k$, which results in the following:

$$\Delta_k = \begin{cases} \frac{G}{B(k,a)}, & 0 \leq k \leq s \\ \frac{G[1 - \rho + \rho B(s,a)(1 - \rho^{(k-s)})]}{\rho^{(k-s)}(1 - \rho)B(s,a)}, & k > s \end{cases} \quad (3)$$

With the approximation that the streams arriving at the stations on the leads emanating from switch 10 are independent Poisson streams, it follows that by indexing the queue variables in equation (3) by the queue-index i, the 'cost' of assigning an arriving job to queue i when the system is in state $(k_1, \ldots, k_N)$ is obtained. Each station i has an associated set of occupancy factors, now denoted $\Delta(i,k_i)$, wherein the parameters s, $\mu$, m, k and $\lambda$ in equation (3) have a corresponding subscript i to signify the $i^{th}$ queue or station. The occupancy factors are updated infrequently (say every half hour to two hours) by processor 20.

The occupancy factors are then used, at the instant an offered job arrives at switch 10, to determine utilization values of the N stations. The instantaneous state of the stations is determined by the vector $(k_1, \ldots, k_N)$ at the moment of arrival of the offered job. Then, the routing control mechanism is as follows: route an offered job, when the system is in state $(k_1, \ldots, k_N)$, to the station which has the smallest utilization value below a predetermined threshold. Typically, the threshold is set at a normalized value of 1.0. Since $0 \leq \Delta(i,k_i) \leq 1.0$ with $\Delta(i,m_i+s_i)=1$, a threshold of 1.0 implies that blocking occurs only if all stations are fully utilized.

EXAMPLE

It is supposed that a job stream with an arrival rate of 4.0 is offered to two stations (N=2). TABLE I summarizes the information about the exemplary system.

TABLE I

| Queue i | Server $s_i$ | Service Rate $\mu_i$ | Waiting Positions $m_i$ | Load $\lambda_i$ | State $k_i$ | Factor $\Delta(i,k_i)$ |
|---|---|---|---|---|---|---|
| 1 | 1 | 1 | 5 | 0.784 | 0 | 0.061 |
|   |   |   |   |   | 1 | 0.140 |
|   |   |   |   |   | 2 | 0.240 |
|   |   |   |   |   | 3 | 0.367 |
|   |   |   |   |   | 4 | 0.530 |
|   |   |   |   |   | 5 | 0.736 |
|   |   |   |   |   | 6 | 1.000 |
| 2 | 5 | 1 | 1 | 3.216 | 0 | 0.076 |
|   |   |   |   |   | 1 | 0.100 |
|   |   |   |   |   | 2 | 0.139 |
|   |   |   |   |   | 3 | 0.206 |
|   |   |   |   |   | 4 | 0.333 |
|   |   |   |   |   | 5 | 0.594 |
|   |   |   |   |   | 6 | 1.000 |

The first column lists the buffer/queue identifiers for the two stations. As the next three columns depict: the first queue has one server, with a service rate of 1.0, and five additional waiting positions; and the second queue has five servers, each with a service rate of 1.0, and one additional waiting position. The fifth column shows the load factor $\lambda_i$; the technique for determining its value will be discussed below. The sixth column shows the current state $k_i$ of each queue. In each case, $k_i$ ranges from 0 to $m_i+s_i$ with $m_i+s_i=6$ for both queues. Finally, the seventh column shows the occupancy factors $\Delta(i,k_i)$ corresponding to each state $k_i$ computed according to equation (3).

By way of an example of the routing control mechanism, if it is supposed that a job arrives when $k_1=2$ and $k_2=3$, then the job is routed to the second station since $\Delta(1,2)=0.240>0.206=\Delta(2,3)$. On the other hand, if the job arrives with $k_1=1$ and $k_2=3$, then the first station is selected since $\Delta(1,1)=0.140<0.206=\Delta(2,3)$. Moreover, if a job arrives with $k_1=k_2=6$, then blocking results.

Figure 3:
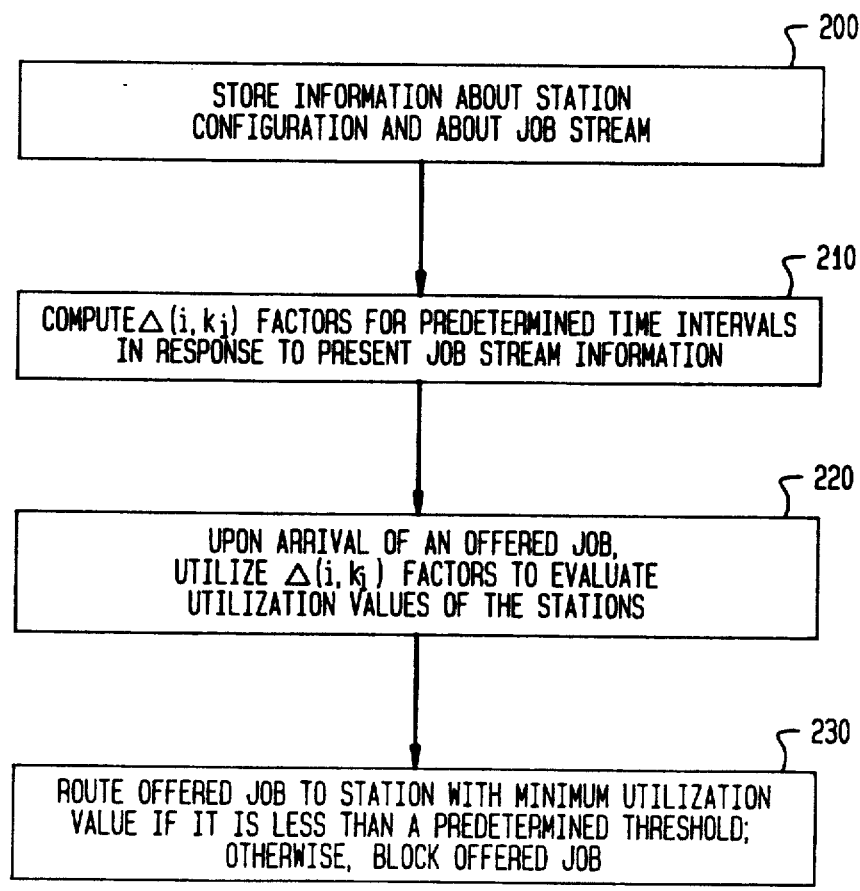
FIG. 3 is a flow diagram illustrative of the steps for controlling the routing of an offered job to one of the several processing stations of FIG. 1.

FIG. 3 is a flow diagram illustrative of the steps described above for controlling the routing of an arriving or offered job in the job stream to the appropriate one of the stations so as to minimize job blocking. Block 200 indicates that certain information about the station configuration (e.g., $s_i$, $\mu_i$ and $m_i$) and job stream information ($\lambda$ and $\lambda_i$) is available for processing by processor 20. As depicted by block 210, the $\Delta(i,k_i)$ factors for predetermined time intervals are computed based on present job stream information. As shown by block 220, upon the detection at switch 10 of an offered job, the occupancy factors as well as the current status of the stations 30,40, ..., 50, as provided to processor 20 by state vector $(k_1, k_2, \ldots, k_N)$, are used to compute the set of utilization values for the stations. The processing of block 230 is then invoked to route, via switching of switch 10 under control of processor 20, the offered job to the station having the minimum utilization factor, provided this factor is less than a predetermined threshold; otherwise, the offered job is blocked.

Determination of the $\lambda_i$ Load Factors

The $\lambda_i$'s represent the allocation of the Poisson arrival steam of rate $\lambda$ to various parallel stations 30, 40, ..., 50 under an optimum, state-independent scheme of Bernoulli splitting. In this scheme, each arriving job is assigned to a station chosen at random, according to a probability distribution, without regard to the status of the stations or to the assignment of previous jobs from the stream. The optimum probability distribution which minimizes blocking under such a random assignment can be determined by the formulation of a complex non-linear program, as follows:

$$\text{minimize} \left( \sum_{i=1}^{N} \lambda_i G(s_i, a_i, m_i) \right), \quad (4)$$

(where $G(s,a,m)$ is defined by equation (2))

$$\text{subject to } \sum_{i=1}^{N} \lambda_i = \lambda \text{ and } \lambda_i \geq 0,$$

$$\text{with } a_i = \frac{\lambda_i}{\mu_i}.$$

The $\lambda_i$'s obtained from the solution of equation (4) are substituted in equation (3) to compute the occupancy factors for state-dependent routing.

Variations on the system arrangement of FIG. 1 may be readily appreciated by those skilled in the art. For instance, an electronic switch 10 will often incorporate processing capability so that switch 10 and processor 20 may coalesce into a single switch means effecting both processing and routing.

It is to be understood that the above-described embodiment is simply illustrative of the application of the application of the principles in accordance with the present invention. Other embodiments may be readily devised by those skilled in the art which may embody the principles in spirit and scope in accordance with the claims.

What is claimed is:

1. A method for routing an offered data job arriving from an incoming job stream through data switch means to one of a plurality of processing stations, the switch means and the stations being arranged in a configuration wherein each of the stations has a measurable current processing status, said method comprising the steps of
    configuring each of the stations with a buffer queue having waiting positions and with a number of servers having a service rate for serving the queue.
    generating and storing allocation load factors in a computer, the computer being coupled to the switch means and the processing stations, said allocation factors being based on a random assignment of the incoming job stream to the stations,
    measuring the current processing status of each of the stations at predetermined intervals, and providing the current processing status at each of the predetermined intervals to the computer,
    executing mathematical forecasting formulae stored in the computer to generate occupancy factors at the predetermined intervals with the computer, said forecasting formulae being expressed in terms of said waiting positions, said servers, said service rate, said allocation factors, and past and present offered data jobs in the job stream as determined by the current processing status at the predetermined intervals of each of the stations, said occupancy factors thereby providing estimates of future data job blockings given the processing status at the beginning of each of the predetermined intervals,
    upon the arrival of the offered data job, measuring the current processing status of the stations and providing each current processing status to the computer,
    generating utilization values in the computer, one for each station, from said occupancy factors in correspondence to the current processing status of the stations to produce routing alternatives through the switch means, and
    establishing a connection route for the offered data job through the switch means in accordance with one of said routing alternatives based on said utilization values.

2. The method as recited in claim 1 wherein
    the job stream has a given job rate,
    the current processing status is indicative of a number of active servers and a number of offered jobs in said waiting positions for each station,
    said allocation factors are expressed in terms of said job rate, and
    said formulae are expressed in terms of said servers, said waiting positions, said service rate, said allocation factors, and a blocking formula which accounts for said future job blockings given the current status of each station at each of the predetermined intervals.

3. A method for routing an offered data job arriving from an incoming job stream through data switch means to one of a plurality of processing stations, the switch means and the stations interconnected in an arrangement wherein each of the stations has a measurable current processing status, said method comprising the steps of
    configuring each of the stations with a buffer queue having waiting positions and with a number of servers having a service rate for serving the queue.
    generating allocation load factors with a computer, the computer being coupled to the switch means and the processing stations, said allocation factors being based on a random assignment of the incoming job stream to the stations,
    measuring the current processing status of each of the stations at predetermined intervals and providing the current processing status to the computer,
    generating occupancy factors at the predetermined intervals with the computer, said occupancy factors being determined by the configuration of each of the stations, said occupancy factors providing estimates of future job blockings given the processing status at the beginning of each of the predetermined intervals, wherein the processing stations are numbered 1, 2, ... i, ... N, and wherein the step of generating occupancy factors includes the step of equating said occupancy factors for the $i^{th}$ station to $\Delta(i, k_i)$ factors determined from a relation $$\Delta(i, k_i) = \begin{cases} \dfrac{G_i}{B(k_i, a_i)}, & 0 \leq k_i \leq s_i \\ \dfrac{G_i [1 - \rho_i + \rho_i B(s_i, a_i)(1 - \rho_i^{(k_i - s_i)})]}{\rho_i^{(k_i - s_i)}(1 - \rho_i) B(s_i, a_i)}, & k_i > s_i \end{cases}$$

-continued $$G_i = \frac{\rho_i^{m_i}(1 - \rho_i)B(s_i,a_i)}{1 - \rho_i + B(s_i,a_i)\rho_i(1 - \rho_i^{m_i})}$$

with $a_i = \frac{\lambda_i}{\mu_i}$, $\rho_i = \frac{a_i}{s_i}$ and $B(s_i,a_i)$ = an Erlang-B blocking of an s-server queue, where $s_i$ is the number of servers serving the $i^{th}$ station queue, $\mu_i$ is the service rate of said $i^{th}$ station queue, $m_i$ is the number of additional waiting positions in said $i^{th}$ station queue, $\lambda_i$ is one of said allocation factors, and $k_i = [0,1, \ldots,] m_i + s_i$, upon the arrival of the offered data job, measuring the current processing status of the stations, providing each current processing status to the computer, and generating utilization values in the computer, one for each station, from said occupancy factors in correspondence to the current processing status of the stations to produce routing alternatives through the switch means, and establishing a connection route for the offered data job through the switch means in accordance with one of said routing alternatives based on said utilization values.

4. The method as recited in claim 3 wherein the step of generating utilization values includes the steps of selecting for each of the stations (i = 1, 2, ..., N) its associated one of said occupancy factors $\Delta(i,k_i)$, with $k_i$ equal to a total number of jobs being serviced by the $i^{th}$ station upon arrival of the offered job, and equating said utilization values to a set of $\Delta(i,k_i)$ factors determined from each current processing status expressed by $k_1, k_2, \ldots, k_N$.

5. A system for selectively routing an offered data job arriving from an incoming job stream of digital data to one of a plurality of processing stations each having a measurable current processing status, each of the stations including a buffer queue having additional waiting positions and a number of servers having a service rate for serving the queue, said system comprising a switch for receiving the job stream, job routing lines interconnecting each of the stations to said switch, and means, coupled to said switch and each of the stations, for controlling said switch to route the offered job, said means for controlling including means for measuring the current status of the stations upon the arrival of the offered job, said status indicative of the number of servers serving the queue in each of the stations, the service rate of the servers, and the number of additional waiting positions in the queue, means, coupled to said means for measuring, for generating allocation load factors based on a random assignment of the incoming job to the stations, for receiving the current status of the stations, and for periodically generating estimates of future job blockings using traffic estimation formulae to produce routing alternatives through the switch means to said job routing lines for the offered job, wherein the processing stations are numbered 1, 2, ... i, ... N, and wherein said means for generating includes means for determining occupancy factors by equating said occupancy factors for the $i^{th}$ station to $\Delta(i,k_i)$ factors determined from a relation $$\Delta(i,k_i) = \begin{cases} \dfrac{G_i}{B(k_i,a_i)}, & 0 \leq k_i \leq s_i \\ \dfrac{G_i[1 - \rho_i + \rho_i B(s_i,a_i)(1 - \rho_i^{(k_i - s_i)})]}{\rho_i^{(k_i - s_i)}(1 - \rho_i)B(s_i,a_i)}, & k_i > s_i, \end{cases}$$

$$G_i = \frac{\rho_i^{m_i}(1 - \rho_i)B(s_i,a_i)}{1 - \rho_i + B(s_i,a_i)\rho_i(1 - \rho_i^{m_i})}$$

with $a_i = \frac{\lambda_i}{\mu_i}$, $\rho_i = \frac{a_i}{s_i}$ and $B(s_i,a_i)$ = an Erlang-B blocking of an s-server queue, where $s_i$ is the number of servers serving the $i^{th}$ station queue, $\mu_i$ is the service rate of said $i^{th}$ station queue, $m_i$ is the number of additional waiting positions in said $i^{th}$ station queue, $\lambda_i$ is one of said allocation factors, and $k_i = [0,1, \ldots,] m_i + s_i$, means for receiving said occupancy factors and for selecting one of said routing alternatives based on said received occupancy values, and means, coupled to said switch, for establishing a connection route through said switch in accordance with said one of said routing alternatives.

6. The system as recited in claim 5 wherein said means for determining further includes means for evaluating for each of the stations (i = 1, 2, ..., N) its associated one of said occupancy factors $\Delta(i,k_i)$, with $k_i$ being the total number of jobs in service by the $i^{th}$ station upon the arrival of the offered job, to produce utilization values, and means for equating said utilization values to the set of $\Delta(i,k_i)$ factors determined from each current status expressed by $k_1, k_2, \ldots, k_N$, and further wherein said means for selecting selects said one routing alternative based on said utilization values.

7. The system as recited in claim 6 wherein said means for controlling further includes means for transmitting to said switch; a station parameter identifying a selected one of the stations to receive the offered job whenever a minimum of said utilization values is less than a predetermined threshold, said selected one of the stations, corresponding to said one of said routing alternatives; or a blocking signal whenever said minimum utilization value is equal to or exceeds said predetermined threshold.

* * * * *